A. C. NORMAN.
NON-SKID DEVICE FOR MOTOR AND OTHER VEHICLES.
APPLICATION FILED JAN. 20, 1921.
1,381,001. Patented June 7, 1921.
2 SHEETS—SHEET 1.
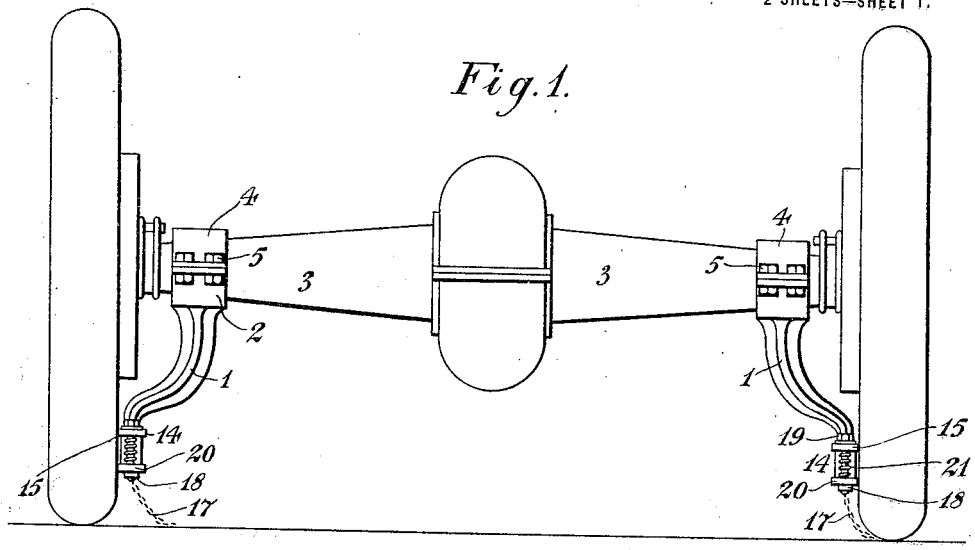
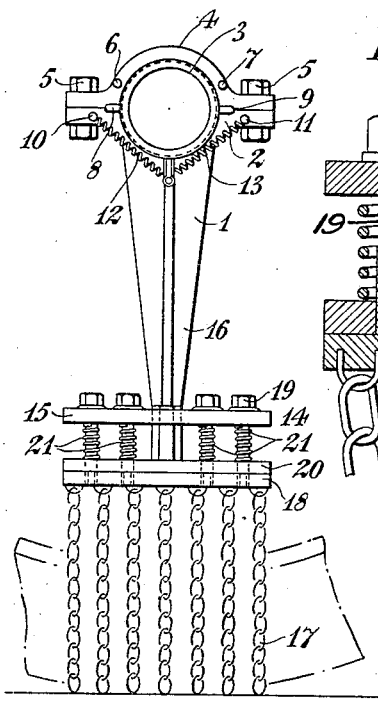
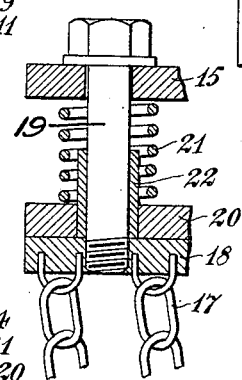
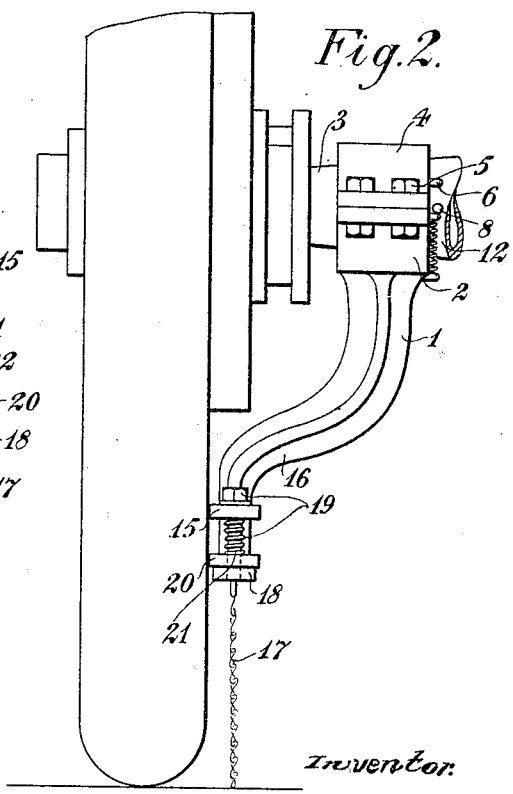
Inventor:
A. C. Norman
by
Atty.

A. C. NORMAN.
NON-SKID DEVICE FOR MOTOR AND OTHER VEHICLES.
APPLICATION FILED JAN. 20, 1921.
1,381,001.
Patented June 7, 1921.
2 SHEETS—SHEET 2.
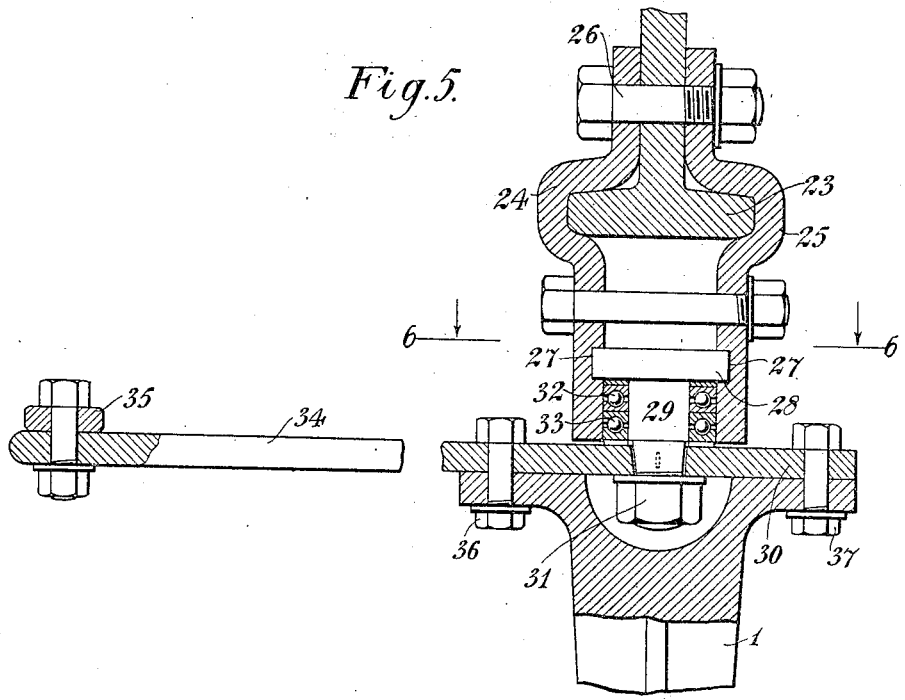
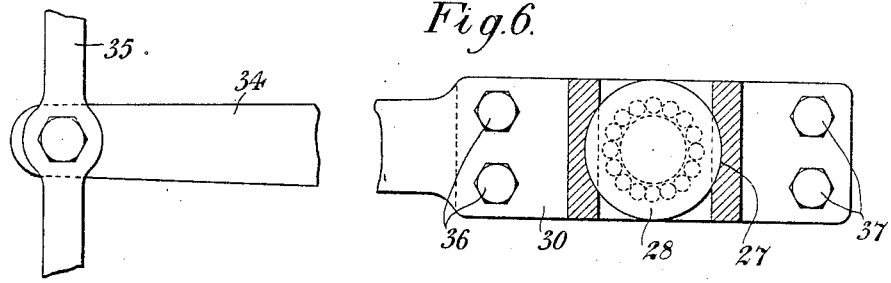
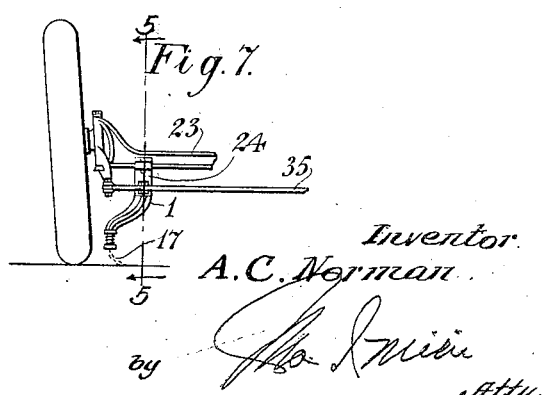
Inventor
A. C. Norman
by
Atty.

UNITED STATES PATENT OFFICE.

ASHLEY CHARLES NORMAN, OF BATTERSEA PARK, LONDON, ENGLAND.

NON-SKID DEVICE FOR MOTOR AND OTHER VEHICLES.

1,381,001.  Specification of Letters Patent.  Patented June 7, 1921.

Application filed January 20, 1921. Serial No. 438,696.

*To all whom it may concern:*

Be it known that I, ASHLEY CHARLES NORMAN, a subject of His Majesty the King of England, and resident of Battersea Park, in the county of London, Kingdom of England, have invented certain new and useful Improvements in or Relating to Non-Skid Devices for Motor and other Vehicles, of which the following is a specification.

This invention relates to non-skid devices for the wheels of motor and other vehicles and has for its object to provide an improved non-skid device which is simple in construction, efficient in operation and which is automatically brought into use.

According to the present invention there is provided inwardly of each or any wheel a hanging or downwardly extending member carrying permanently or detachably secured thereto a device with which the adjacent wheel coöperates so as to prevent or minimize skidding. The said device is preferably in the form of a chain-netting or a plurality of loose but laterally interconnected chains the lower end or ends of which if desired may be in contact with the road in normal running. The links of the chain netting are preferably twisted so that the netting may ride flat as a whole. The hanging or downwardly extending member preferably comprises an arm adapted to be loosely secured in position on the axle or tubular casing surrounding the axle. When used on a front axle the arm is supported by a swivel joint secured to the front axle, as shown in Fig. 7.

I will describe with reference to the accompanying drawing a construction in accordance with the present invention but I do not limit myself to the precise construction described and illustrated.

Figure 1 is an end view of the rear axle of a motor car showing two non-skid devices in accordance with the present invention applied thereto.

Fig. 2 is an end view drawn to an enlarged scale of the rear axle and non-skid device.

Fig. 3 is a side view of the non-skid device of Fig. 2.

Fig. 4 is a section drawn to an enlarged scale showing the connection of the chain to its support.

Fig. 5 is a vertical section on the line 5—5 of Fig. 7 showing the swivel joint connection of the device when applied to a front axle.

Fig. 6 is a sectional plan on the line 6—6, Fig. 5.

Fig. 7 shows a general arrangement of the device on a smaller scale attached to the front axle.

Referring to the drawing the upper end of the hanging arm 1 is provided with an arcuate or other suitable end 2 to engage the axle 3 or tubular casing and the said arcuate end may be supported and retained in position by an arcuate or other suitably shaped cover piece 4 secured to the arcuate end of the downwardly extending member by bolts 5 or equivalent. The latter is loosely secured to the axle and the rotational movement thereof (if allowed for) may be limited by suitable stops such as pins 6, 7, screwed into the upper cover piece 4 and adapted to butt against pins 8, 9, screwed into the shaft; or the said downwardly extending member may be rigidly secured to the axle or tubular casing surrounding the axle; or if so desired the end 2 of the hanging arm may be provided with pins 10, 11 connected by springs 12, 13 to a hook-bolt secured to the axle 3. The lower end 14 of the downwardly extending arm is preferably of inverted T-shaped form and is adapted to carry a member 15. The member 15 is provided with a central hole through which passes the lower end 16 of the arm 1 the said end being of hexagonal, square or other suitable form so as to act simultaneously as a guide for the member 15 and prevent rotation thereof. A piece of metallic netting 17 such as chain-netting or other suitable material such as loose chains are as shown connected as by welding or in other suitable means to a vertically slidable plate 18 to which the member 15 is connected by studs 19 a plate 20 being interposed between the member 15 and the plate 18 carrying the chain. The plate 20 is rigidly connected to the hexagonal or other suitably shaped lower end of the arm 1. The said adjustable member 15 is preferably disposed so that its length is at right angles to the axle or tubular casing surrounding the axle and the downward movement of the length of metallic netting or loose chain is limited by the inverted T- shaped plate 20 of the downwardly extending member 1, which end may be integrally or detachably but rigidly secured to the said member.

The metallic netting support is adjustably and resiliently superposed by means of the studs 19 and springs 21 above the plate 20 forming the inverted T-shaped end of the downwardly extending arm. The ends of the several chains may be connected to their supporting plate by splitting the upper chain links and welding the split ends into the plate as shown in Fig. 4 and the springs may be guided by short tubes 22 secured in the lower plate 20 and surrounding the studs 19 which are secured on the plates 18 as shown.

In the construction and arrangements shown in Fig. 5 the arm 1 is supported from the front axle 23 by a clamping device comprising two L shaped plates 24, 25 connected to the axle by a bolt 26. The two plates 24, 25 are arcuately recessed as at 27 to support the head 28 of a bolt 29 having a tapered end carrying a plate 30 provided with a correspondingly tapered central hole. The plate 30 which is keyed on to the bolt 29 is secured in position by a nut 31, ball bearing races 32, 33, being interposed between the head of the bolt and the upper face of the plate 34. Formed in one with the plate 30 as shown (or removably attached thereto) is an arm 34 which is connected to the tie rod 35 coupling the steering knuckles of the two front wheels, only one of which wheels is shown in Fig. 7. As before the upper end of the arm 1 is of arcuate form and the flanged portion thereof is connected by bolts 36, 37 to the plate 34 so as to swivel or move therewith and with the movements of the tie rod 35. The arcuate portion of the upper end of the arm 1 allows for tightening up and adjustment of the nut 31.

In use the non-skidding effect is due to the mounting of the relevant wheel on the adjacent portion of loose chains which may be thus drawn under the wheel. In general the non-skidding effect is produced on the off wheel or wheels relatively to the direction of skid.

The non-skidding device hereinbefore described is thus automatic in action and if desired may be provided as a permanent or removable attachment to either the front axle or rear axle or to both the front axle and rear axle.

While as here shown and described, the wheel engaging portion of the non-skid device is shown as loose chains, it is apparent that any other desired form of this structure which will answer the purpose of the invention may be used without departing from the spirit of the invention.

What I claim is:—

1. A non-skid device comprising an arm, rotatively supported from an axle of a vehicle, a flexible mat carried by said arm, and means for turning the arm and thereby the mat in the steering of the vehicle.

2. A non-skid device comprising an arm, a swivel joint connecting said arm, an axle, a flexible mat carried by the arm, and a connection between said arm and steering rod of the vehicle.

3. A non-skid device comprising opposite plates adapted to be connected to the axle of a vehicle, a pivot pin supported by said plates below the axle, an arm supported by said pivot pin, a flexible mat carried by said arm, and a connection between said arm and the steering rod of the vehicle.

4. A non-skid device for vehicles, comprising an arm, a plate fixed at the lower end of said arm, a plate slidably mounted on the arm above the fixed plate, a mat carrying plate arranged below the fixed plate, connections between the sliding plate and mat carrying plate, spring elements interposed between the fixed plate and sliding plate, and a fixed mat secured to the mat carrying plate, whereby the mat carrying plate and sliding plate may move in one direction under strain on the mat and return to normal position, following relief of such strain.

5. A non-skid device for vehicles, comprising an arm connected to the axle of the vehicle, a plate carried by the lower end of the arm, and rigid therewith, spaced plates arranged above and below the fixed plate, and removably connected with one another through the fixed plate, a flexible mat carried by one of said spaced plates, a resilient means arranged between one of said spaced plates and said fixed plate to normally maintain the spaced plate in a predetermined relation with the fixed plate.

6. A non-skid device comprising an arm, adapted to be carried by the axle of a vehicle, said arm depending below the axle, a fixed plate carried by the free end of said arm, a flexible mat, and a mat supporting member slidably engaging the fixed plate and limited in movement in both directions relative to said fixed plate, a resilient means between the mat supporting member and the fixed plate to maintain said member in a predetermined relation to the fixed plate while permitting a movement of the member under strain on the mat.

In testimony whereof I have hereunto signed my name.

ASHLEY CHARLES NORMAN.